United States Patent
Drinkwater

(10) Patent No.: US 9,885,394 B2
(45) Date of Patent: Feb. 6, 2018

(54) HANDLE FOR KITCHEN DEVICES

(71) Applicant: Lifetime Brands, Inc., Garden City, NY (US)

(72) Inventor: William Edwin Drinkwater, Greenlawn, NY (US)

(73) Assignee: LIFETIME BRANDS, INC., Garden City, NY (US)

( * ) Notice: Subject to any disclaimer, the term of this patent is extended or adjusted under 35 U.S.C. 154(b) by 414 days.

(21) Appl. No.: 14/703,460

(22) Filed: May 4, 2015

(65) Prior Publication Data
US 2015/0316949 A1 Nov. 5, 2015

Related U.S. Application Data

(60) Provisional application No. 61/988,467, filed on May 5, 2014.

(51) Int. Cl.
| | | |
|---|---|---|
| *F16D 41/00* | (2006.01) | |
| *F16D 41/07* | (2006.01) | |
| *F16D 41/08* | (2006.01) | |
| *F16D 41/069* | (2006.01) | |

(52) U.S. Cl.
CPC ......... *F16D 41/076* (2013.01); *F16D 41/073* (2013.01); *F16D 41/084* (2013.01); *F16D 41/069* (2013.01); *Y10T 74/1526* (2015.01)

(58) Field of Classification Search
None
See application file for complete search history.

(56) References Cited

U.S. PATENT DOCUMENTS

| | | | | |
|---|---|---|---|---|
| 2,023,951 | A * | 12/1935 | Cohan | F16K 31/60 192/41 A |
| 2,824,636 | A * | 2/1958 | Troendly | F16D 41/07 192/45.1 |
| 3,194,369 | A * | 7/1965 | Witte | F16D 41/10 192/36 |
| 3,534,836 | A * | 10/1970 | Dane | B25B 13/462 192/43.1 |
| 4,466,523 | A | 8/1984 | De Carolis et al. | |
| 4,788,874 | A * | 12/1988 | Nelson | F16D 41/12 192/12 B |
| 4,998,605 | A * | 3/1991 | Ferris | F16D 41/07 192/41 A |
| 5,056,635 | A | 10/1991 | Grimsley | |
| 5,069,079 | A * | 12/1991 | Vandervoort | F16D 23/0606 192/48.6 |

(Continued)

OTHER PUBLICATIONS

International Search Report and Written Opinion for International Application No. PCT/US2015/029062, dated Jul. 31, 2015. (9 pages).

*Primary Examiner* — Robert W Hodge
*Assistant Examiner* — Ryan P Dodd
(74) *Attorney, Agent, or Firm* — Tutunjian & Bitetto, P.C.

(57) ABSTRACT

A knob/handle for kitchen devices having a rotary motion is provided. The knob/handle includes a handle body and a modified sprag clutch mechanism integrated into the handle body to enable rotation of the handle in one pre-designated direction for application of torque to a connected shaft. A hub is secured to the handle body and has one end in communication with the modified sprag clutch mechanism and an opposing end configured for connection to a shaft of a kitchen device.

17 Claims, 15 Drawing Sheets

(56) References Cited

U.S. PATENT DOCUMENTS

| | | | |
|---|---|---|---|
| 5,139,123 A | | 8/1992 | Rutke |
| 5,531,389 A | * | 7/1996 | Husted .................... A47J 42/46 241/169.1 |
| 5,765,669 A | * | 6/1998 | Adams .................. B25B 13/462 192/43 |
| 6,584,874 B1 | | 7/2003 | Wade et al. |
| 6,902,046 B1 | | 6/2005 | Dumas |
| 2006/0118379 A1 | | 6/2006 | Miura |

* cited by examiner

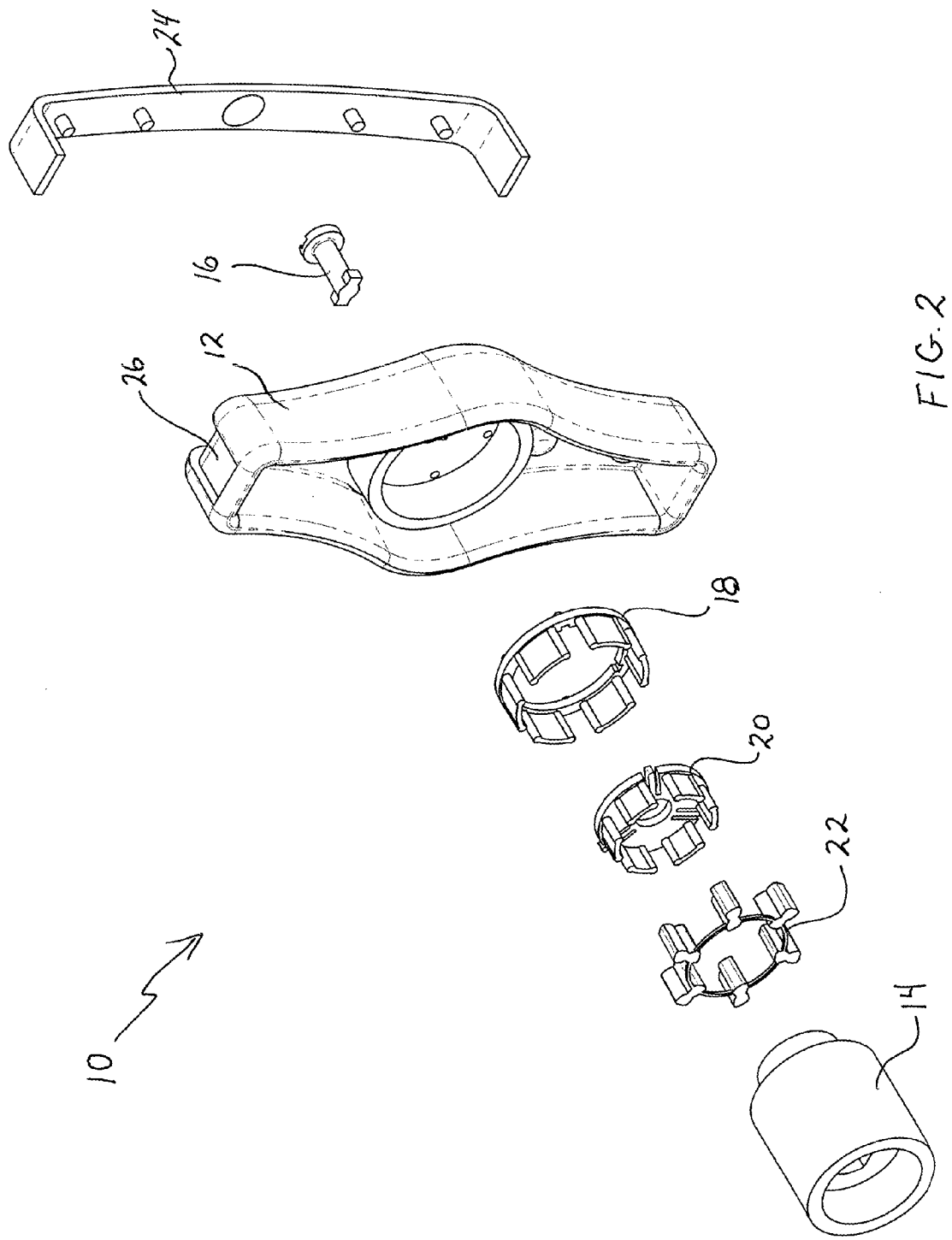

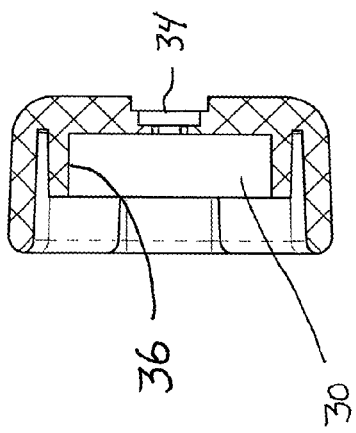
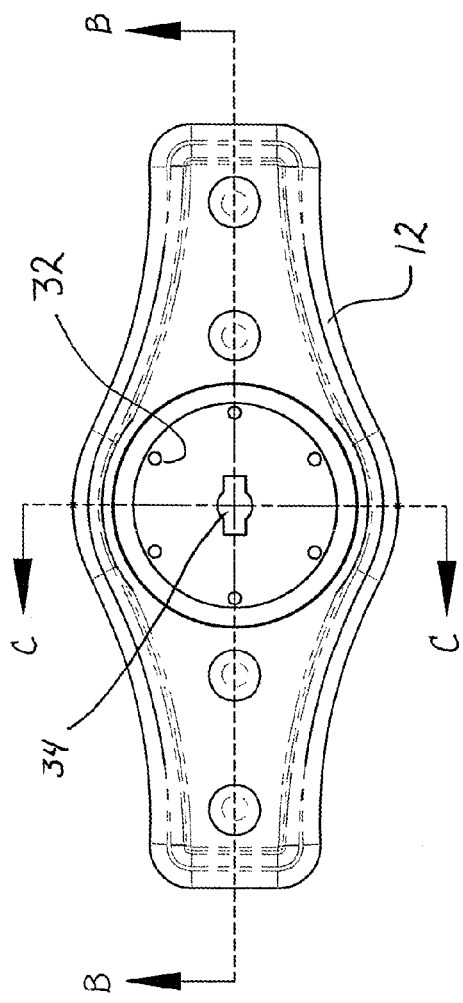
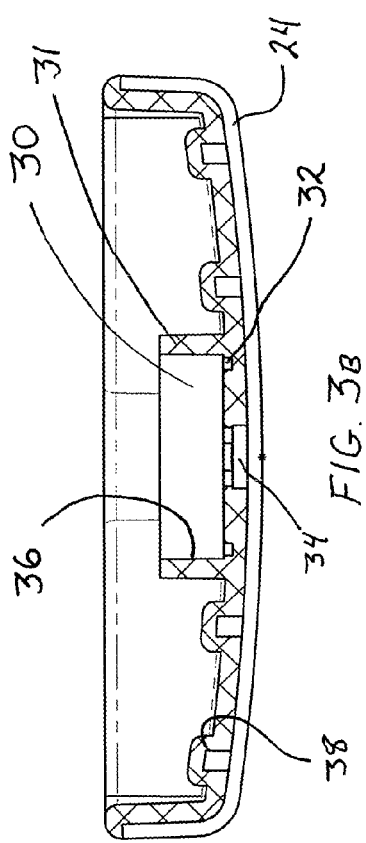

HANDLE FOR KITCHEN DEVICES

CROSS REFERENCE TO RELATED APPLICATIONS

This application claims priority from U.S. Provisional Patent application Ser. No. 61/988,467 filed on May 5, 2014, the entire contents of which is incorporated herein by reference.

BACKGROUND

1. Technical Field

The present invention relates to kitchenware or barware related devices requiring a rotary action, such as, for example a can opener, a corkscrew, etc. More particularly, it relates to a handle for such kitchen devices that incorporates a clutch mechanism.

2. Description of Related Art

Kitchenware and barware devices that require rotary action can sometimes be difficult to operate. This is primarily due to the torque required to rotate the device to effect the intended action. For example, a manual can opener requires a user to clamp the opener down on the edge of the can and while retaining the clamped position, rotate the handle to move the cutting blade along the periphery of the can. This rotation of the handle not only requires some strength, but must be done in increments (i.e., the user can only turn the handle a certain amount before having to physically remove their hand from the handle and reposition it for another rotation).

In the case of a corkscrew, as the corkscrew handle is rotated to drive the worm into the cork, the further into the cork the worm goes, the greater the friction between the cork and the worm. As this friction increases, so does the torque required to rotate the handle.

SUMMARY

In accordance with an aspect of the present principles, the handle for kitchen devices includes a knob/handle for kitchen devices having a rotary motion. The knob/handle includes a handle body, a modified sprag clutch mechanism integrated into the handle body, and a hub secured to the handle body and having one end in communication with the modified sprag clutch mechanism and an opposing end configured for connection to a shaft of a kitchen device.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views:

FIG. 2 shows an exploded perspective view of the knob/handle for kitchen devices according to an implementation of the present principles;

FIG. 3A shows a rear view of the knob/handle for kitchen devices according to an implementation of the present principles;

FIG. 3B shows a cross-sectional view of knob/handle of taken along line B-B of FIG. 3A;

FIG. 3C shows a cross-sectional view of knob/handle of taken along line C-C of FIG. 3A;

DETAILED DESCRIPTION

Figure 1A:
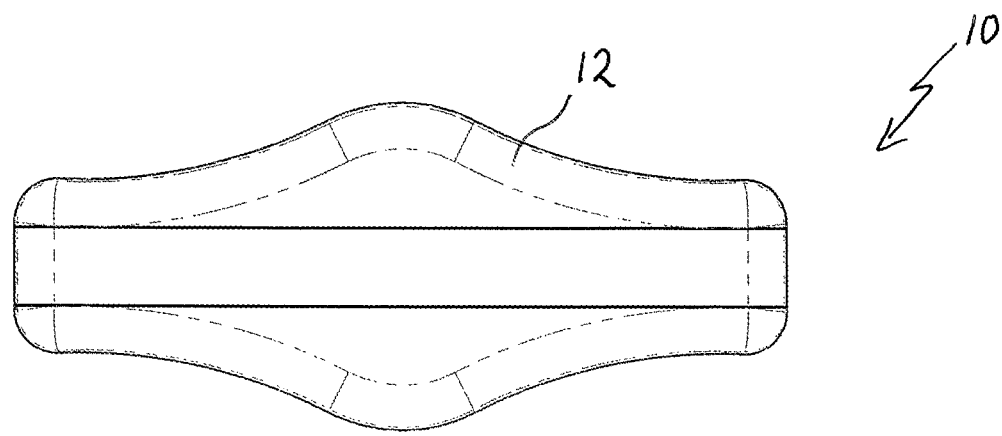
FIGS. 1A-1C show the knob/handle for kitchen devices according to an implementation of the present principles.
Figure 1B:
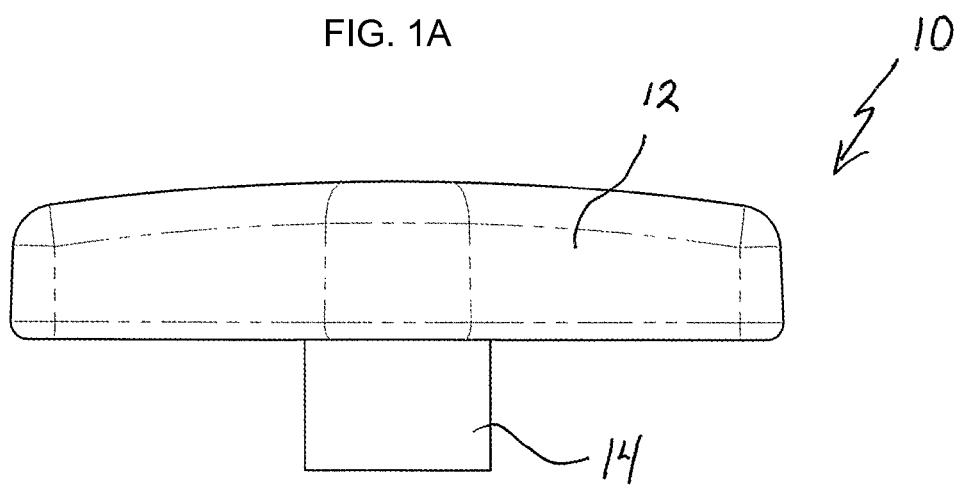
Figure 1C:
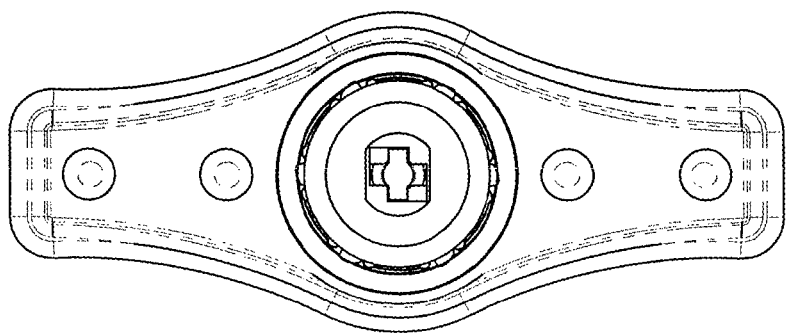
Figure 4A:
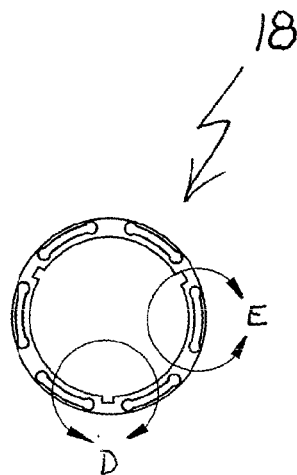
FIGS. 4A-4E shows various views of the outside cage of the sprag clutch mechanism contained within the knob/handle, according to an implementation of the present principles.
Figure 4B:
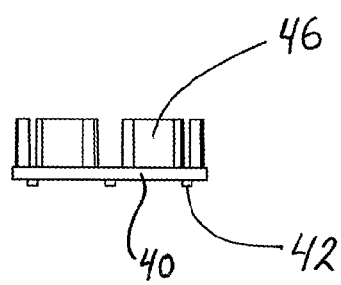
Figure 4C:
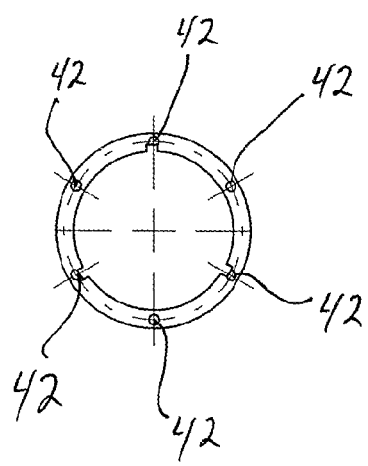
Figure 4D:
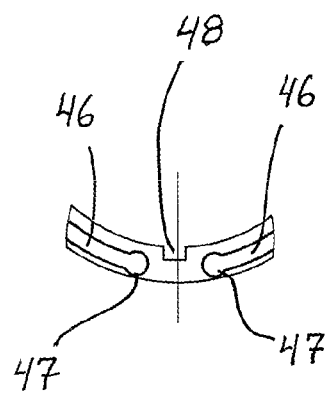
Figure 4E:
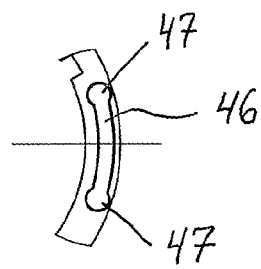
Figure 5A:
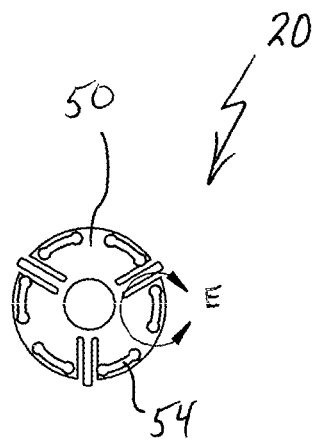
FIGS. 5A-5E shows various views of the inside cage of the sprag clutch mechanism contained within the knob/handle, according to an implementation of the present principles.
Figure 5D:
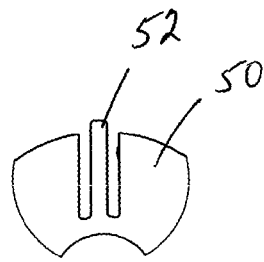
Figure 5B:
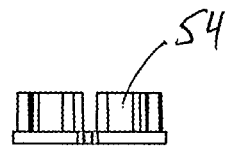
Figure 5E:
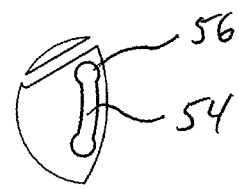
Figure 5C:
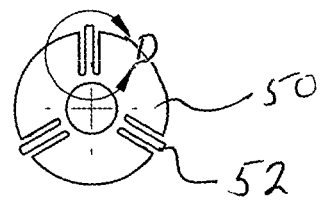

Referring to FIGS. 1A-1C there is shown the handle 10 according to an implementation of the present principles. Handle 10 has a hand engaging portion 12 and a hub 14 configured to connect the handle to the rotary shaft of a kitchen device. In the present exemplary implementation, handle 10 and corresponding hub 14 is configured for connection to a hand operated can opener.

FIG. 2 shows an exploded perspective of the handle 10 and all its parts. As shown, a modified sprag clutch mechanism made up of an outer cage 18, and inner ring 20 and sprag teeth 22 are positioned within the handle 12 and hub 14. A pin 16 secures the hub 14 within the handle 12 and thereby retains the parts of the modified sprag clutch in place. A logo bar or other decorative part 24 can be used to cover the pin 16 and provide a finished look to the handle 12. In accordance with a preferred implementation of the present principles, all parts that make up the handle and clutch mechanism are manufactured from ABS plastic. As will be described in more detail below, it is the manufacturing of all these parts of the same material that allows for an infinite level of actuation, such that even the smallest rotation in the pre-designated direction will be converted into the necessary/sufficient torque to the drive the connected shaft.

Although the below exemplary implementations are described with respect to a can opener and/or corkscrew, the concepts disclosed herein are applicable to any device requiring rotary motion to operate. For example, pepper grinders, meat grinders, can openers, corkscrews, etc.

FIGS. 3A-3C show the handle 12 having a substantially cylindrical receiving cavity 30 positioned therein and formed by walls 31. The cavity 30 includes recesses 32 positioned in the floor or base of the cavity 30 and adjacent the walls 31. As will be described below, the inner surface 36 of walls 31 form an outer hub of the modified sprag clutch mechanism. A centrally disposed pin receiving aperture 34 having a specific geometric configuration is open into the cavity 30.

FIGS. 4A-4E show an example of the outer ring/cage 18 of the modified sprag clutch mechanism according to an implementation of the present principles. In this example, the outer cage has a base 40 with at least two protrusions 42 that extend downward from the bottom thereof. On an upper side of the base are the cage walls 46 each having slightly bulbous ends 47. As shown in this configuration, there are six (6) cage walls 46 that make up the circumference of the outer cage 18. The base also includes notches 48 configured to receive connecting elements 52 of the inner ring 20. In accordance with other implementations, the outer cage 18 need not have protrusions 42, and can be secured within the walls 36 of the cavity 30 in many other ways without departing from the intended scope of the present principles. By way of further example, the walls 36 of the cavity 30 could be keyed to receive the outer cage in a manner so as to not interfere with the operation of the same.

FIGS. 5A-5E show the details of the inner ring/cage 20 of the sprag clutch mechanism according to an implementation of the present principles. The inner cage 20 has a base 50 having protruding legs 52 that are received by the notches 48 in the outer cage, thus securing the inner cage to rotate synchronously with the outer cage, in the pre-designated direction established by the sprag teeth. The inner cage walls 54 extend upward from the base 50 and have a similar configuration to the outer cage walls 46 by including bulbous ends 56. The bulbous ends 47 and 56 of the respective outer and inner cage walls 46 and 54, operate to maintain the sprag teeth from moving around freely and also act as a pivot point for the sprag teeth (i.e., outer cage walls 46 with ends 47) and apply appropriate pressure to the sprag teeth to ensure the same is always in contact with the inner (see below description of hub in FIG. 7) and outer hub (i.e., inner walls 36 of opening 30 in handle 12).

Figure 6C:
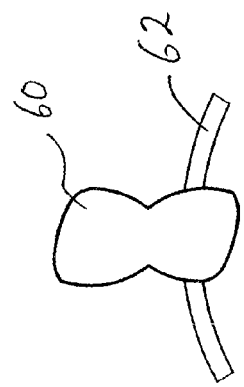
FIGS. 6A-6C show various views of the sprag teeth of the clutch mechanism of the knob/handle, according to an implementation of the present principles.
Figure 6A:
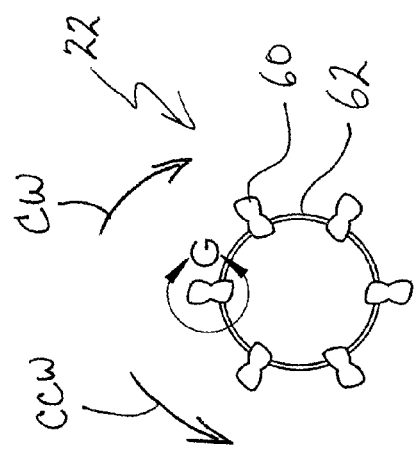
Figure 6B:
Figure 7D:
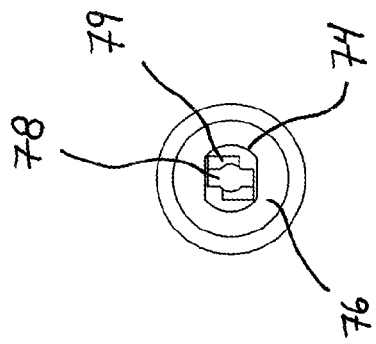
FIGS. 7A-7D shows various views of the hub connector of the knob/handle having the sprag clutch mechanism, according to an implementation of the present principles.
Figure 7C:
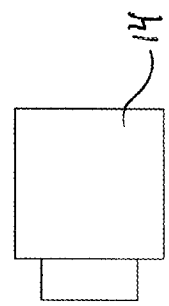
Figure 7B:
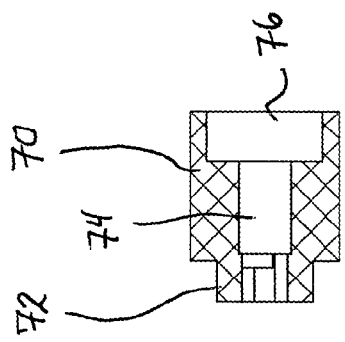
Figure 7A:
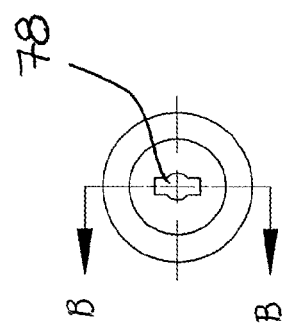

FIGS. 6A-6C show an example of the sprag teeth gear 22 according to an implementation. The sprag teeth 60 are connected to a runner 62 and have a specific geometric orientation such that when positioned between the inner and outer cages, the teeth allow the handle to rotate freely in one direction, and completely lock up against the outer and inner hub when the handle is rotated in the opposite direction. In accordance with one implementation, the runner 62 is used to enable simple construction of the modified sprag clutch mechanism, and is configured to break once used. These details are explained below with reference to FIG. 10. In other embodiments, the runner 62 is not needed and the device could be assembled with the individual sprag teeth 60.

Those of skill in the art of clutch mechanisms will appreciate that the pre-designated direction of rotation dictated by the sprag teeth can be reversed depending on the particular kitchen device being used. For a manual can opener, rotation of the hub is preferably away from the user which would be considered clockwise (CW).

Figure 8C:
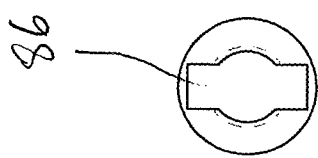
FIGS. 8A-8C shown various views of the pin configured to secure the hub to the knob/handle.
Figure 8B:
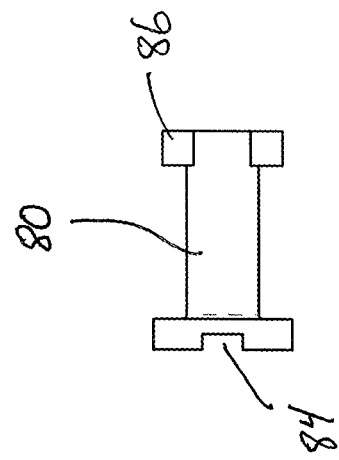
Figure 8A:
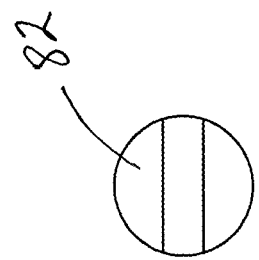

FIGS. 7A-7D show the hub 14 according to an exemplary implementation of the present principles. Hub 14 has two ends 70 and 72. These ends 70 and 72 have different circumferences. End 70 is larger in circumference than end 72 and includes a central aperture 74 having a cross section corresponding to a cross section of a shaft of the kitchen device to which the handle is to be attached. A larger opening or aperture 76 adjacent the central aperture provides a larger receiving opening for the shaft to be received into opening 74. At the other end 72, there is an opening 78 that is geometrically shaped to receive the same geometrically shaped end 86 of the pin 16 (See FIGS. 8B and 8C). Pin 16 has a shaft 80 and a head 82 which a slot 84. As will be evident from FIG. 2, end 86 of the pin passes through the handle and all clutch parts and is secured within the opening 78/79 of hub 14, thus securing all parts together (with the exception of the logo plate 24). Those of skill in the art will recognize that ends 70 and 72 do not need to be different sizes in diameter/circumference, and can be configured to be the same as needed for the particular application.

One important aspect of the hub connections to the corresponding shaft is that there is no rotational slippage between the two elements. Thus, the use of geometric cross sections (in the hub and shaft) that are configured to mate with each other in a non-slipping arrangement are preferred.

Figure 9C:
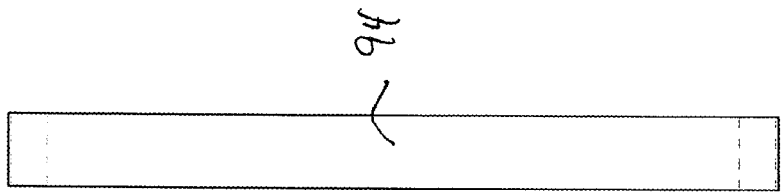
FIGS. 9A-9C shows various views of an exemplary logo plate configured to be attached to the knob/handle having the sprag clutch mechanism, according to an implementation of the present principles.
Figure 9B:
Figure 9A:
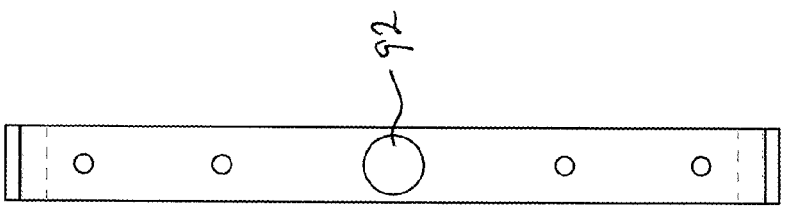

FIGS. 9A-9C shows and example of the logo plate 24 which is configured to snap into the slot 26 (see FIG. 2) on the top surface of the handle 12. One or more posts 90 protrude from the underside of the plate 24 and are received into corresponding aligned holes 38 (see FIG. 3B) in the slot 26. The outer surface 94 of the logo plate 24 is configured to be imprinted, engraved or receive a sticker with the name of the company manufacturing, producing or marketing the same.

Figure 10:
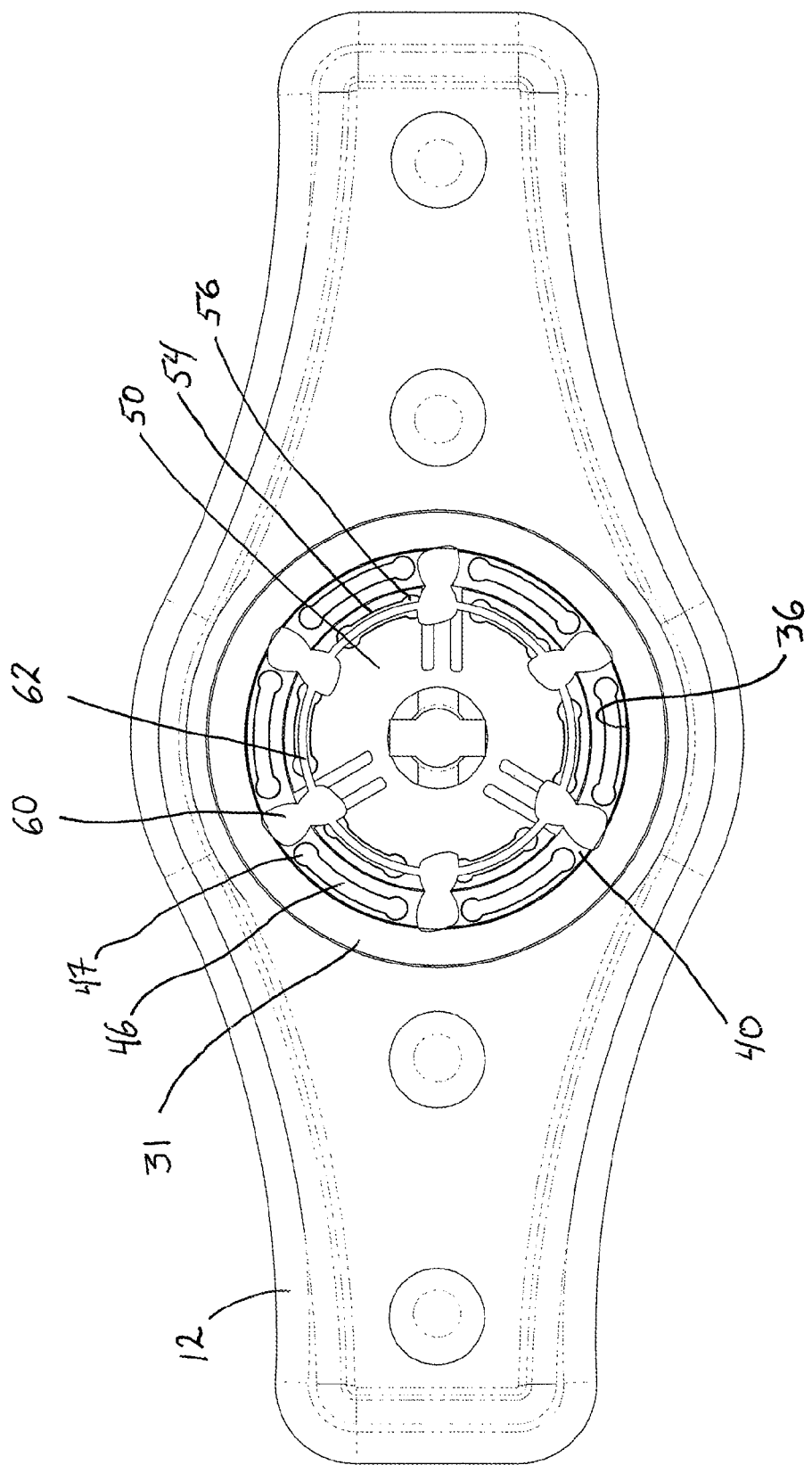
FIG. 10 is a bottom view of the knob/handle assembled with the clutch mechanism and with the hub removed, according to an implementation of the present principles.

FIG. 10 shows a bottom view of the handle 12 completely assembled, yet with the hub 14 removed. Here, the assembly and operation of the handle with modified sprag clutch mechanism is described. As shown, the base 40 of the outer ring 18 is positioned within the cavity 30 formed by walls 31 and secured via posts to the corresponding apertures 32 (not shown). The base 50 of the inner cage 20 is positioned in fixed relation to the outer cage via posts 52 (in base of inner cage) and corresponding slots 48 (in base of outer cage). The sprag teeth 60 mounted on runner 62 are then positioned such that they pass through the openings in the respective inner and outer cage walls 54 and 46, respectively. As shown, the outermost surface of the sprag teeth 60 contact the inner surface 36 of the handle cavity 30, which inner surface operates as an outer hub of the modified sprag clutch mechanism. The inner most surface of the sprag teeth 60 would then be in contact with the outer surface of the hub portion 72 (see FIG. 7) which acts as the inner hub of the modified sprag clutch mechanism. Once the hub is installed and the handle attached to the shaft of, for example, a can opener, upon first use the sprag runner 62 would break, and the openings in the outer and inner cage walls would operate to not only retain the sprag teeth in place but to ensure the proper pivot point of the same. In the configuration shown in FIG. 10, the geometry of the sprag teeth is such that the handle will rotate freely with respect to the hub in a counter clockwise (CCW) direction, and once direction is changed to clockwise, the sprag teeth will lock the outer hub of the handle to the inner hub formed by the outer surface 72 of the hub, and thereby rotate the same with the handle rotation. In this configuration, there is no ratcheting effect, and the modified sprag clutch mechanism allows for completely infinite rotation in the pre-designated direction, while the reverse direction is also infinite without having preset or predetermined detent type ratchet points.

FIGS. 11-15 show an alternative implementation of the handle with modified sprag clutch mechanism according to the present principles. This particular handle is configured for use with a corkscrew device. As is understood in the removing of a cork from a bottle, a worm screw or gear is rotated in one direction to penetrate the cork, and once sufficiently penetrated, the cork is removed (either through manually pulling, or more often, another mechanical mechanism that secures around or to the top of the bottle and enables the extraction of the cork. In either case, once the cork is removed, it must be manually removed from the worm. This requires that the handle connected to the worm be stationary with respect to the same. As discussed above with the handle of FIGS. 1-10, the handle will freely rotate in one direction (not imparting torque to the hub), and will apply the required torque in the other rotated direction. In order to apply this concept to the corkscrew implementation, a means for locking the handle from free rotation is required to remove the cork from the worm once removed from the bottle. FIGS. 11-15 show an example the implementation of a locking mechanism capable of locking the handle from the free rotation (i.e., when not applying torque to the connected hub).

Figure 11A:
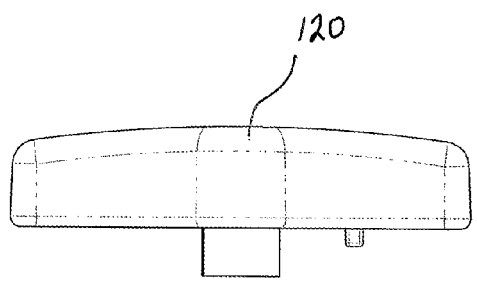
FIGS. 11A-11C show the knob/handle for kitchen devices of FIG. 10, according to another implementation of the present principles.
Figure 11C:
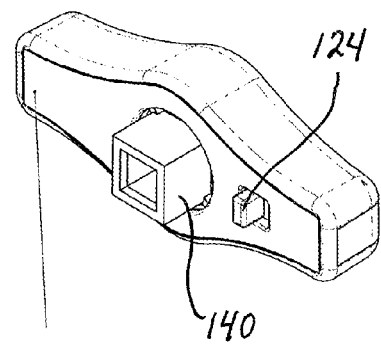
Figure 11B:
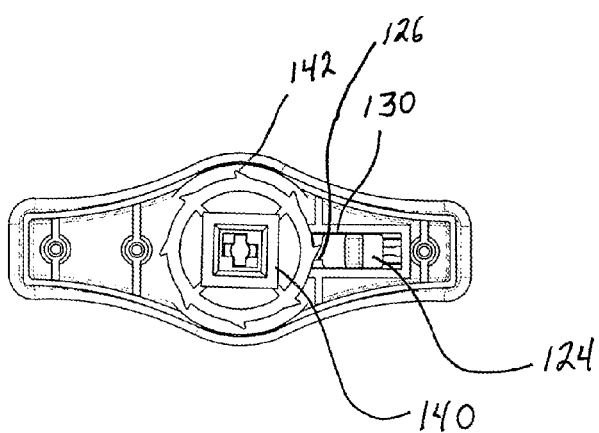
Figure 12C:
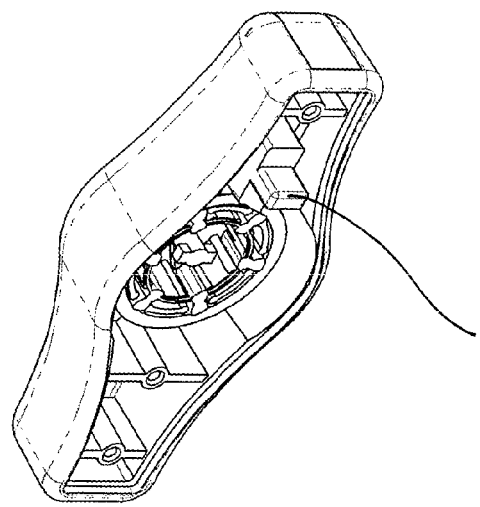
FIGS. 12A-12C show the knob/handle for kitchen devices of FIG. 11, with the hub removed, according to an implementation of the present principles.
Figure 12A:
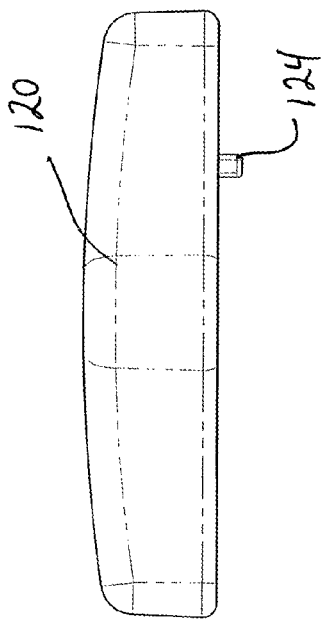
Figure 12B:
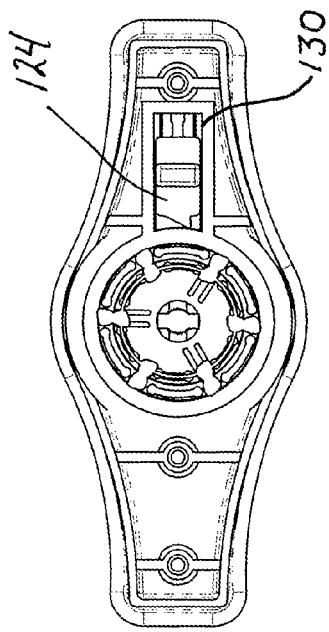

As shown in FIGS. 11-12, the handle 120 includes a hub 140, a bottom cover plate 122 and lock 124. The lock 124 is slidably received in a slot 130 integrally formed within the body of the handle 120.

Figure 13:
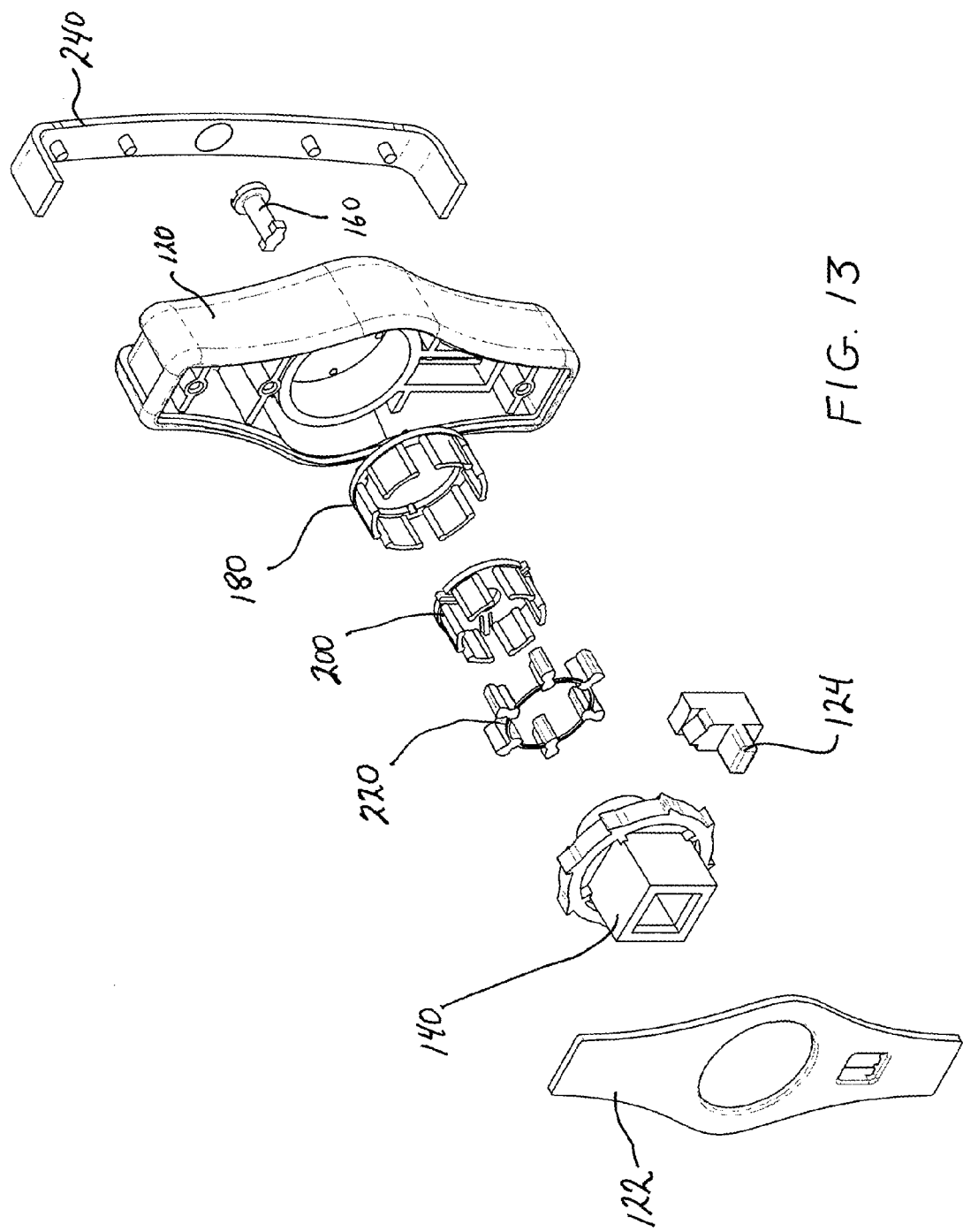
FIG. 13 shows an exploded perspective view of the knob/handle for kitchen devices according to another implementation of the present principles.

FIG. 13 shows an exploded perspective view of the corkscrew handle 120 and all its parts. As with the embodiment of FIGS. 1-10, the outer cage 180, inner cage 200 and sprag teeth 220 are similarly configured to be received into the cavity within the handle 120. The pin 160 secures all the parts of the modified sprag clutch mechanism (180, 200, 220) and the hub 140 together. The cover plate 122 physically covers the bottom of the handle 120 and allows for the lock 124 to be accessed via a corresponding aperture. The cover plate 122 is not necessary for operation of the handle, and is generally provided as a decorative feature and to enclose the inner workings of the handle.

Figures 14A, 14C:
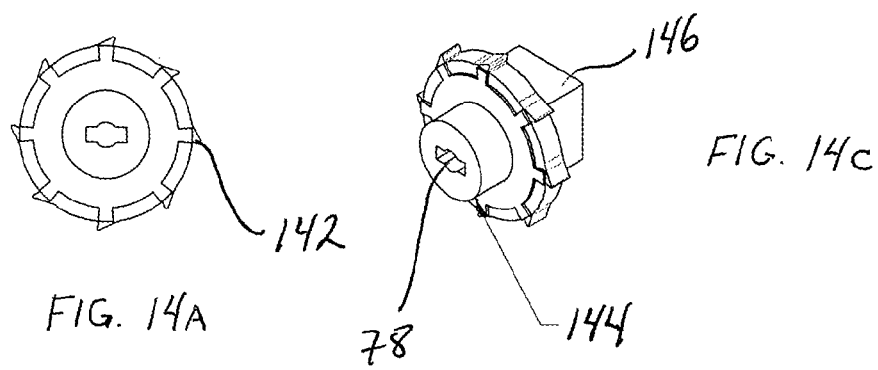
FIG. 14A-14C shows various views of the hub of the knob/handle for kitchen devices according to an implementation of the present principles.
Figure 14B:
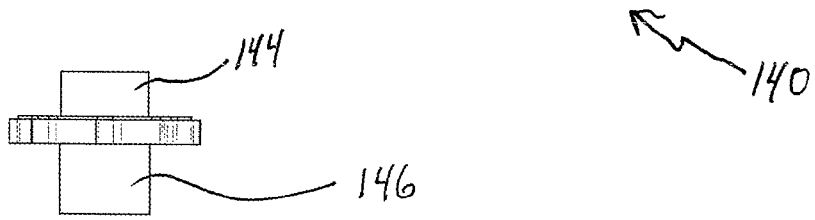
Figure 15A:
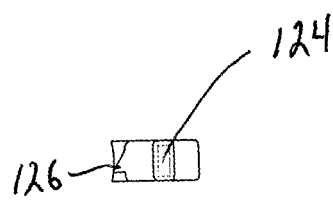
FIGS. 15A-15C shows various views of the lock of the knob/handle for kitchen devices according to an implementation of the present principles.
Figure 15B:
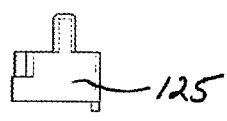
Figure 15C:
Figure 16C:
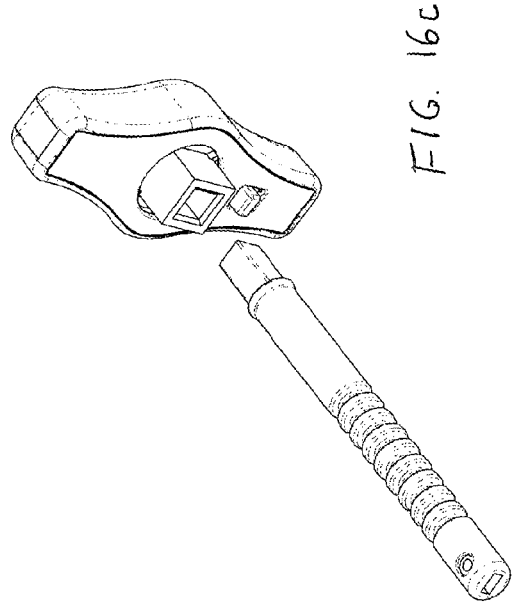
FIGS. 16A-16D show example connections of the hub of the knob/handle for kitchen devices to the shafts of corresponding kitchen devices, according to an implementation of the present principles.
Figure 16D:
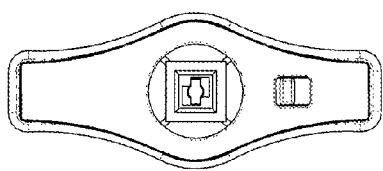
Figure 16A:
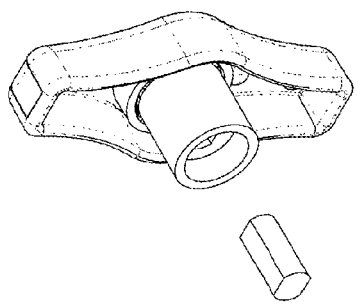
Figure 16B:
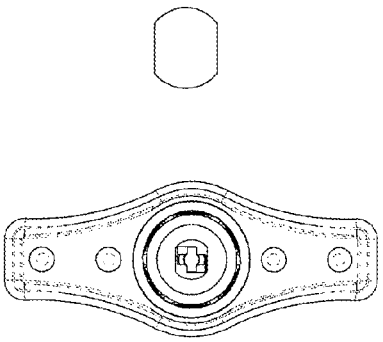

Referring to FIGS. 14-15, there is shown the hub 140 having a plurality of teeth 142 circumferentially disposed there around. On one side of hub is a cylindrical portion 144 configured to become the inner hub of the modified sprag clutch mechanism when assembled and includes the centrally disposed geometrically shaped opening 78 corresponding to the pin end 86. On the other end 146 hub 140 has a square shaped cross section configured to fit onto the end of a corkscrew worm gear. The lock 124 has a body 125 and an outwardly extending pawl 126 configured to engage the teeth 142 of the hub when slid into contact with the same. The notch 127 on the bottom of the body 125 can be used to align the lock in the slot 130 within the handle. Those of skill in the art will appreciate that the locking mechanism (i.e. lock 124 and teeth 142 of hub 140) can be configured in many different ways without departing from the intended scope of the present principles.

FIGS. 16 show the handle having hubs with different cross sections corresponding to the shafts to which they are to be connected. Those of skill in the art will appreciate that almost an infinite number of geometric configurations can be integrated into the hub to correspond to the cross section of the intended shaft for connection. In accordance with other contemplated implementations, the kitchen device may not include or require a shaft for rotation. In these implementations, parts of the kitchen device may be used in the modified sprag clutch mechanism. By way of example a rotary grater does not have a rotating shaft, but rather a drum. In this instance, the drum itself would be received into the handle of the present principles. IT is also conceivable that the drum could form part of the modified sprag clutch mechanism (e.g., outer wall of the cavity).

In the embodiments disclosed above, the handle with modified sprag clutch mechanism may be connected to the device to which it is being used in many different ways, so as to prevent linear pull off of the handle from the shaft. For example, permanent connections or temporary connections can be used. Permanent connections may include those types of connections done during manufacturing of the device. For example, permanent connections can include, but are not limited to, glued connection, ultrasonic welding connections, press fit connections, etc. Temporary connections could enable the use of a single handle on more than one devices configured to receive the same. Examples of a temporary connection could be a set screw arrangement, but may also include a rod and ball bearing configuration where a slot in the shaft receives the ball bearing, and the rod is spring loaded to lock the ball bearing into the slot when not engaged. Engagement of the rod releases the locked ball bearing and allows for a quick release type of handle connection.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

What is claimed is:

1. A knob/handle for a kitchen device having a shaft capable of rotating in a predetermined rotation direction, the knob/handle comprising:
 a handle body;
 a sprag clutch mechanism disposed in the handle body; and
 a hub disposed in the handle body and having one end in communication with the sprag clutch mechanism and an opposing end configured for connection to the shaft of the kitchen device; and a locking mechanism configured to lock the handle body and enable rotation of the connected shaft in a direction opposite that of the predetermined rotation direction.

2. The knob/handle according to claim 1, wherein the handle body comprises a receiving cavity integrated therein having inner walls, the sprag clutch mechanism further comprising:
an outer cage positioned within the receiving cavity;
an inner cage positioned within the outer cage; and
at least two sprag teeth positioned within the receiving cavity such that said teeth contact inner wall surfaces of said receiving cavity, said sprag teeth having a geometric configuration enabling rotation of the connected shaft in a single predetermined rotation direction of clockwise or counterclockwise.

3. The knob/handle according to claim 1, further comprising a pin configured to secure said hub to the handle body and thereby retain said sprag clutch mechanism within said handle body.

4. The knob/handle according to claim 2, wherein said outer cage further comprises a base having a plurality of spaced upward extending cage walls each having a bulbous end.

5. The knob/handle according to claim 2, wherein said inner cage further comprises a base having at least one protruding leg and a plurality of spaced upwardly extending walls, each having a bulbous end.

6. The knob/handle according to claim 2, further comprising a runner connecting the at least two sprag teeth are initially connected to each other, said runner being configured to break after an initial use of the knob/handle.

7. The knob/handle according to claim 2, wherein
said outer cage further comprises a base having a plurality of spaced upward extending cage wails each having a bulbous end;
said inner cage further comprises a base having at least one protruding leg and a plurality of spaced upwardly extending walls, each having a bulbous end; and
wherein said at least two sprag teeth pass through said walls in said inner and outer cage to contact inner wall surfaces of said receiving cavity.

8. The knob/handle according to claim 1, wherein the locking mechanism comprises:
a lock having a pawl, said lock being slidably positioned in the handle body; and
a plurality of teeth positioned around the hub, said pawl engaging at least one of said plurality of teeth when the lock is in slid into the locked position.

9. A device for a assisting in the rotation of a kitchen device having a rotary motion, the device comprising:
a body;
a sprag clutch mechanism disposed within the body; and
a means for disposing the sprag clutch mechanism into communication with rotary parts of the kitchen device, such that said sprag clutch mechanism enables one way rotation of the rotary parts of the kitchen device in a pre-determined rotation direction; and
a locking mechanism configured to lock the body and enable rotation of the connected rotary parts of the kitchen device in an opposite direction than that of the predetermined rotation direction.

10. The device according to claim 9, wherein said body comprises a handle.

11. The device according to claim 9, wherein said sprag clutch mechanism comprises:
an outer cage positioned within a receiving cavity of the handle;
an inner cage positioned within the outer cage; and
at least two sprag teeth positioned within the receiving cavity such that said teeth contact inner wall surfaces of said receiving cavity, said sprag teeth having a geometric configuration enabling rotation of the rotary parts of the kitchen device in a single predetermined rotation direction of clockwise or counterclockwise.

12. The device according to claim 11, wherein said outer cage further comprises a base having a plurality of spaced upward extending cage walls each having a bulbous end.

13. The device according to claim 11, wherein said inner cage further comprises a base having at least one protruding leg and a plurality of spaced upwardly extending walls, each having a bulbous end.

14. The device according to claim 11, further comprising a runner connecting the at least two sprag teeth, said runner being configured to break after an initial use of the knob handle.

15. The device according to claim 11, wherein,
said outer cage further comprises a base having a plurality of spaced upward extending cage walls each having a bulbous end;
said inner cage further comprises a base having at least one protruding leg and a plurality of spaced upwardly extending walls, each having a bulbous end; and
wherein said at least two sprag teeth pass through said walls in said inner and outer cage to contact inner wall surfaces of said receiving cavity.

16. The device of according to claim 11, wherein said means for disposing the sprag clutch mechanism into communication with rotary parts of the kitchen device comprises a hub disposed within the body and having one end in communication with the sprag clutch mechanism and an opposing end configured for connection to the rotary parts of the kitchen device.

17. The device according to claim 9, wherein the locking mechanism comprises:
a lock having a pawl, said lock being slidably positioned in the handle body; and
a plurality of teeth positioned around the hub, said pawl engaging at least one of said plurality of teeth when the lock is in slid into the locked position.

* * * * *